(12) United States Patent
Hannah

(10) Patent No.: US 6,362,920 B1
(45) Date of Patent: Mar. 26, 2002

(54) ENHANCING THE OUTPUT OF A POLARIZED LIGHT SOURCE USING BIREFRINGENT MATERIALS

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/755,270

(22) Filed: Jan. 5, 2001

(51) Int. Cl.$^7$ ................................. G02B 5/30
(52) U.S. Cl. ................. 359/497; 359/495; 362/19; 353/20
(58) Field of Search .................. 359/487, 495, 359/497; 353/20; 362/19

(56) References Cited

U.S. PATENT DOCUMENTS 6,080,980 A  * 6/2000 Steinle ..................... 359/497

OTHER PUBLICATIONS

Eric C. Hannah, "Enhancing the Output of a Polarized Source", U.S. Patent Application Serial No. 09/690,369 filed Oct. 17, 2000.

* cited by examiner

Primary Examiner—Darren Schuberg
(74) Attorney, Agent, or Firm—Trop, Pruner & Hu, P.C.

(57) ABSTRACT

A light source may enhance the generation of circularly polarized light of a desired polarization state. The light that is produced by a lamp and initially rejected by a circular polarizer may be subjected to polarization reversal. The polarization reversed light may again impinge on the circular polarizer. A substantial percentage of the previously rejected and then polarization reversed light is passed by the circular polarizer.

18 Claims, 1 Drawing Sheet

ENHANCING THE OUTPUT OF A POLARIZED LIGHT SOURCE USING BIREFRINGENT MATERIALS

BACKGROUND

This invention relates generally to lamps that emit polarized light for example for use with reflective spatial light modulators.

Spatial light modulators may use a liquid crystal light valve to modulate light for display or projection of images. Such modulators may use reflective or transmissive technologies. Spatial light modulators may be formed on integrated circuits together with logic circuitry. Thus, integrated displays with integrated drive electronics may be formed.

As a result, spatial light modulators may be formed in a relatively cost effective fashion. Ultimately, such displays may be competitive with conventional displays such as cathode ray tubes. Generally, spatial light modulators utilize circularly polarized light, which is reflected from a liquid crystal surface. That surface has its reflective properties modulated by underlying electrodes. The resulting displays may be able to modulate large light powers, without excessive heating, with reduced box sizes for the same screen size as compared to cathode ray tubes.

Reflective spatial light modulators need a bright source of circularly polarized light. Conventionally, a high pressure discharge source, such as a weakly ionized plasma, produce unpolarized light. The unpolarized light is then filtered through a circular polarizer. The polarizer transmits the circularly polarized photons and rejects photons of the opposite polarization state.

Ultimately some of the light from the light source passes outwardly for reflection from the spatial light modulator. The remaining light is trapped and absorbed inside the light source as wasted heat. Ideally, fifty percent of the amplitude of the initial light produced by the lamp can be emitted by the lamp cavity to the outside optics in the appropriate circularly polarized state. The other half of the light produced by the lamp is wasted. Thus, the light source must generate twice the amplitude that is actually used. This may result in unnecessary heating, unnecessary expense, and increased component size.

Thus, there is a need for better ways to produce a circularly polarized light source, for example in use in connection with reflective spatial light modulators.

DETAILED DESCRIPTION

Figure 1:
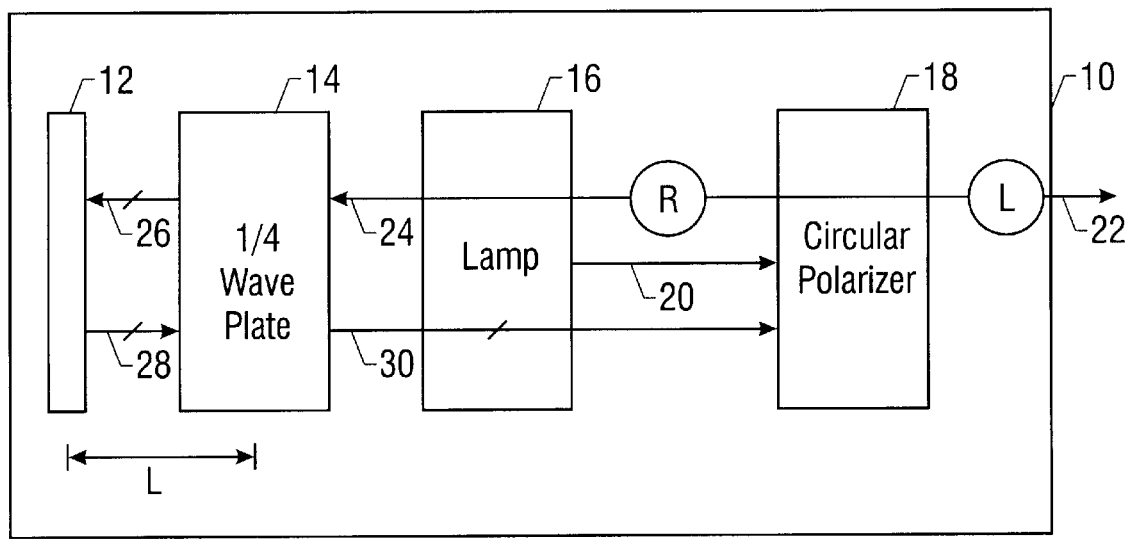
FIG. 1 is a schematic depiction of one embodiment of the present invention.

Referring to FIG. 1, a lamp 16 may be a high pressure discharge source such as a mercury arc lamp that may use a weakly ionized plasma to produce unpolarized light. The resulting light is filtered in a circular polarizer 18. The circular polarizer 18 may pass only one of two circular polarization states. In one embodiment, the circular polarizer 18 passes the left polarization state and prevents the passage of the right polarization state. Thus, the light 22 of the appropriate polarization is passed from the circular polarizer 18 for use in a suitable optical system such as a reflective spatial light modulator.

Ideally, fifty percent of the amplitude of the light produced by the lamp 16 that impinges on the circular polarizer 18 is passed in the appropriate polarization. The remaining portion of the impinging light is rejected by the polarizer 18. The rejected light, indicated at 24, passes through a quarter wave plate 14 that converts circularly polarized light (either right-handed or left-handed) into linearly polarized light at 45° to the fast axis of the plate 14. The light that passes through the plate 14, indicated at 26, is reflected from a reflector 12, which may be a simple mirror.

The reflected light, indicated at 28, passes outwardly through the plate 14. The plate 14 takes the reflected linearly polarized light and converts it into oppositely, circularly polarized light. For example, if the rejected light is right-handed, circularly polarized light, the plate 14 initially converts that light into linearly polarized light. That linearly polarized light is reflected by the reflector 12 and the plate 14 converts the light passing through it to left-handed, circularly polarized light.

Birefringent materials may be utilized as the plate 14. Birefringent have two dielectric constants that are aligned along crystalline space axes. As a result, light that is polarized in the direction of one of the optically active axes propagates through the material at constant velocity. The transmission velocity varies according to the axis used. The two polarization directions are the "slow" and "fast" axes.

Circularly polarized light can be analyzed into the vector sum of two components of light with perpendicular linear polarizations, with the two components offset by a constant phase factor of $\eta/2$. This phase shift results in an electric field vector that rotates around the axis of propagation at the frequency of light. If the circularly polarized light is transmitted through a Birefringent material thick enough to shift the two components' phase offset by a quarter wavelength, then linearly polarized light will exit the material with the direction of linear polarization being 45° from the slow and fast axes. Thus, quarter wave plates can turn circularly polarized light into linearly polarized light and vice versa.

In accordance with one embodiment, the integrating cavity around the light source and/or the output filter may be coated with a quarter wave layer of birefringent material. That is, a coating of birefringent material may be applied to a sufficient thickness to create a quarter wave plate 14. After propagating through the birefringent material, reflecting from the integrating cavity interlayer and finally propagating back through the birefringent layer, the net result is again circularly polarized light, but with the opposite sense from a simple reflection. This creates the correct polarization to pass through the exit polarizer 18.

Birefringent coatings of controllable thickness are available from Measurements Group, Inc., Raleigh, N.C. 27611. These coatings may be sprayed on coatings of polycarbonate or epoxy, as two examples.

The light that passes through the plate 14 and is reflected by the reflector 12 together with the light that was rejected by the plate 14 forms the light indicated at 30. This light again impinges on the circular polarizer 18. Again, ideally all of the incident light is passed by the circular polarizer 18 because it is of the appropriate circular polarization state. Any remaining, unpassed light is again reflected and undergoes the same processing described previously. Ultimately, substantially all of the light produced by the lamp 16 may eventually pass through the circular polarizer 18 in some embodiments.

The action of the reflector 12 and the plate 14 effectively reverses the circular polarization imposed by the circular polarizer 18. Thus, each time half of the light is rejected by the circular polarizer 18, its circular polarization state is reversed. The rejected light, whose polarization is reversed, passes through the circular polarizer 18 on the next cycle.

Figure 2:
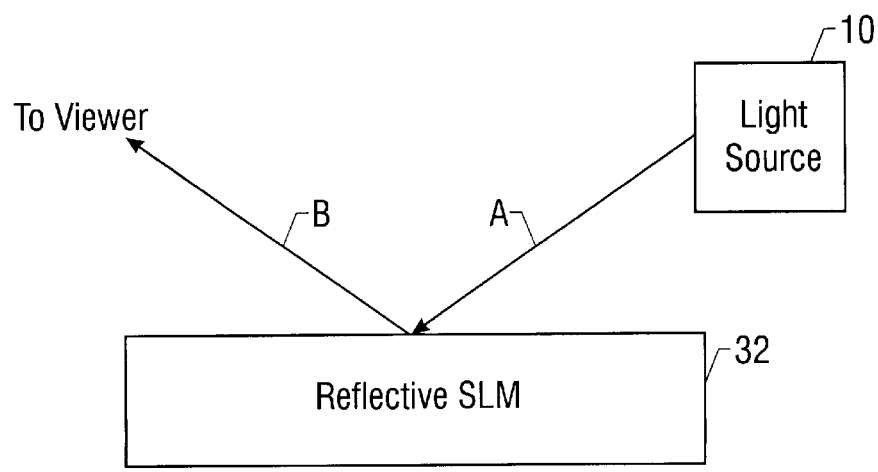
FIG. 2 is a depiction of the embodiment shown in FIG. 1 used in connection with a reflective spatial light modulator.

Referring to FIG. 2, the light source 10 may emit the circularly polarized light of the appropriate state to illuminate the reflective spatial light modulator 32. The incident light, indicated by A, is then modulated to form light beam B which may be viewed by a user or provided for projection in a projection display system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A light source comprising:
   a circular polarizer to pass light in one polarization state;
   a device to reverse the state of polarization of light that is not passed by said circular polarizer, said device including a birefringent material; and
   a lamp positioned between said circular polarizer and said device.

2. The light source of claim 1 wherein said lamp is a high pressure discharge lamp.

3. The light source of claim 1 including a cavity, said material being coated on said cavity.

4. The light source of claim 1 wherein the device includes a quarter wave plate.

5. The light source of claim 4 wherein said device includes a reflector positioned to reflect light passing through said plate back through said plate to impinge on said circular polarizer.

6. The light source of claim 4 wherein said quarter wave plate includes a birefringent coating.

7. A reflective spatial light modulator comprising:
   a light source including a lamp, a circular polarizer to pass light in one polarization state, and a device to reverse the polarization state of light that is not passed by said circular polarizer, said device including a birefringent material, said lamp positioned between said device and said circular polarizer; and
   a modulator to receive the light from said light source.

8. The modulator of claim 7 wherein said lamp is a high pressure discharge lamp.

9. The modulator of claim 8 wherein said material acts as a quarter wave plate.

10. The modulator of claim 9 said device including a quarter wave plate and a reflective element that reflects light passed by said quarter wave plate towards said circular polarizer.

11. The modulator of claim 7 wherein said source includes a cavity coated with said material.

12. A method comprising:
    generating light between a circular polarizer and a birefringent material;
    passing a first portion of said light in a first circular polarization state through said circular polarizer and rejecting a second portion of said light in a second circular polarization state; and
    reversing the polarization state of said second portion by passing said second portion through the birefringent material.

13. The method of claim 12 wherein passing includes causing said light to impinge on a circular polarizer that passes light in a first circular polarization state.

14. The method of claim 12 wherein reversing the polarization state of said second portion includes passing the light through a birefringent material in a first direction, reflecting the light and passing it through the birefringent material in a second direction opposite to the first direction.

15. The method of claim 12 wherein reversing includes passing the second portion through a quarter wave plate.

16. The method of claim 15 wherein reversing includes passing the second portion through a quarter wave plate two times.

17. The method of claim 16 including reflecting said second portion having passed through said plate one time in a first direction back through said plate in the opposite direction.

18. The method of claim 12 including coating the birefringent material on a surface exposed to said light.

* * * * *

UNITED STATES PATENT AND TRADEMARK OFFICE
CERTIFICATE OF CORRECTION

PATENT NO. : 6,362,920 B1
DATED : March 26, 2002
INVENTOR(S) : Hannah et al.

It is certified that error appears in the above-identified patent and that said Letters Patent is hereby corrected as shown below:

<u>Title page,</u>
Item [75], Inventor: add the name -- Michael O'Conner --.

<u>Column 4,</u>
Line 3, "8" should be -- 7 --.

Signed and Sealed this

Seventeenth Day of December, 2002

JAMES E. ROGAN
*Director of the United States Patent and Trademark Office*